US011350265B2

(12) United States Patent
Pu et al.

(10) Patent No.: US 11,350,265 B2
(45) Date of Patent: May 31, 2022

(54) PRESENCE DISCOVERY TECHNIQUES

(71) Applicant: Apple Inc., Cupertino, CA (US)

(72) Inventors: Tianyan Pu, Cupertino, CA (US); Li Su, San Jose, CA (US); Zhu Ji, San Jose, CA (US); Yang Li, Plano, TX (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/903,529

(22) Filed: Jun. 17, 2020

(65) Prior Publication Data

US 2020/0413239 A1  Dec. 31, 2020

Related U.S. Application Data

(60) Provisional application No. 62/868,364, filed on Jun. 28, 2019.

(51) Int. Cl.
*H04W 8/00* (2009.01)
*H04W 24/08* (2009.01)
*H04L 27/26* (2006.01)
*H04W 4/70* (2018.01)

(52) U.S. Cl.
CPC .......... *H04W 8/005* (2013.01); *H04L 27/266* (2013.01); *H04L 27/2659* (2013.01); *H04W 4/70* (2018.02); *H04W 24/08* (2013.01)

(58) Field of Classification Search
CPC ........ H04W 8/005; H04W 56/001; G01S 5/14
See application file for complete search history.

(56) References Cited

U.S. PATENT DOCUMENTS

| 7,826,343 | B2 | 11/2010 | Krasner |
| 8,295,311 | B2 | 10/2012 | Guey |
| 9,300,355 | B2 | 3/2016 | Linden et al. |
| 9,891,158 | B2 | 2/2018 | Quint et al. |
| 10,176,200 | B2 | 1/2019 | Lavi et al. |
| 10,285,144 | B2 | 5/2019 | Lei et al. |

(Continued)

FOREIGN PATENT DOCUMENTS

WO   2019089432   5/2019

OTHER PUBLICATIONS

Yang et al. "Time Domain Interference Cancellation for Cognitive Radios and Future Wireless Systems", http://www.eecs.berkeley.edu/Pubs/TechRpts/2010/EECS-2010-61.html, 103 pages, May 11, 2010.

(Continued)

*Primary Examiner* — Ayaz R Sheikh
*Assistant Examiner* — Debebe A Asefa
(74) *Attorney, Agent, or Firm* — Kowert, Hood, Munyon, Rankin & Goetzel, P.C.

(57) ABSTRACT

This disclosure relates to techniques for performing presence discovery in a wireless communication. A wireless device may monitor a wireless medium for discovery signals. A candidate discovery signal may be detected. A frequency offset estimation consistency check may be performed on the candidate discovery signal. A peak to sidelobe ratio check may be performed on the candidate discovery signal. The wireless device may determine whether the candidate discovery signal is a false positive based at least in part on the frequency offset estimation consistency check and the peak to sidelobe ratio check.

20 Claims, 10 Drawing Sheets

(56) References Cited

U.S. PATENT DOCUMENTS

| | | | |
|---|---|---|---|
| 2009/0327395 A1* | 12/2009 | Park | H04W 8/005 |
| | | | 709/202 |
| 2011/0026413 A1* | 2/2011 | Swarts | H04B 17/20 |
| | | | 370/252 |
| 2018/0262313 A1 | 9/2018 | Nam et al. | |
| 2019/0089570 A1 | 3/2019 | Li et al. | |
| 2019/0141708 A1* | 5/2019 | Chen | H04L 41/12 |
| 2021/0207974 A1* | 7/2021 | Zhou | G01C 21/206 |

OTHER PUBLICATIONS

Thomas et al. "Automated Particle Picking based on Correlation Peak Shape Analysis and Iterative Classification", World Academy of Science, Engineering and Technology International Journal of Physical and Mathematical Sciences, vol. 6, No. 1, 7 pages, 2012.

\* cited by examiner

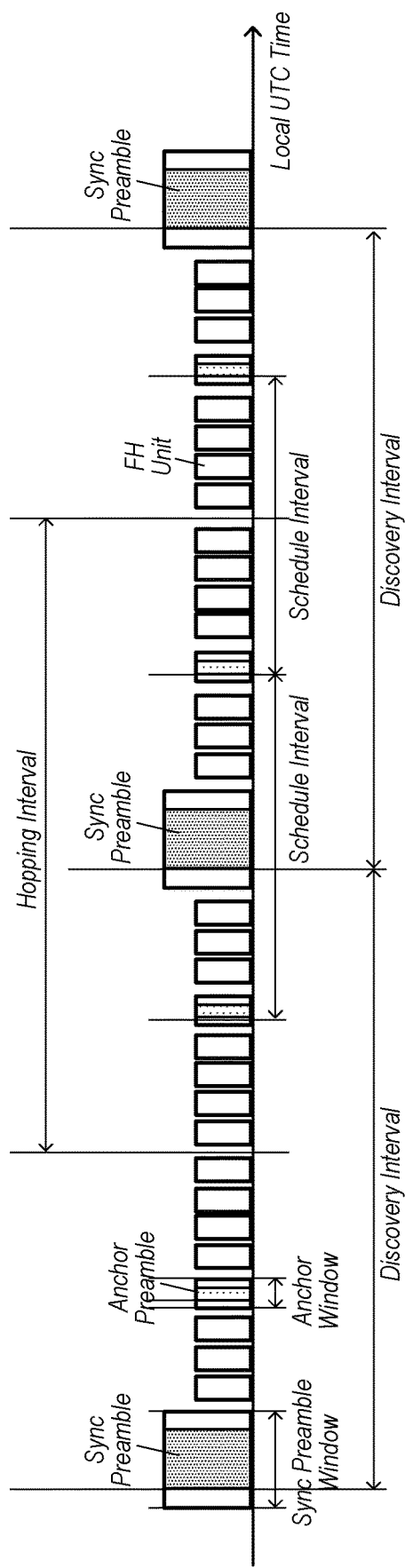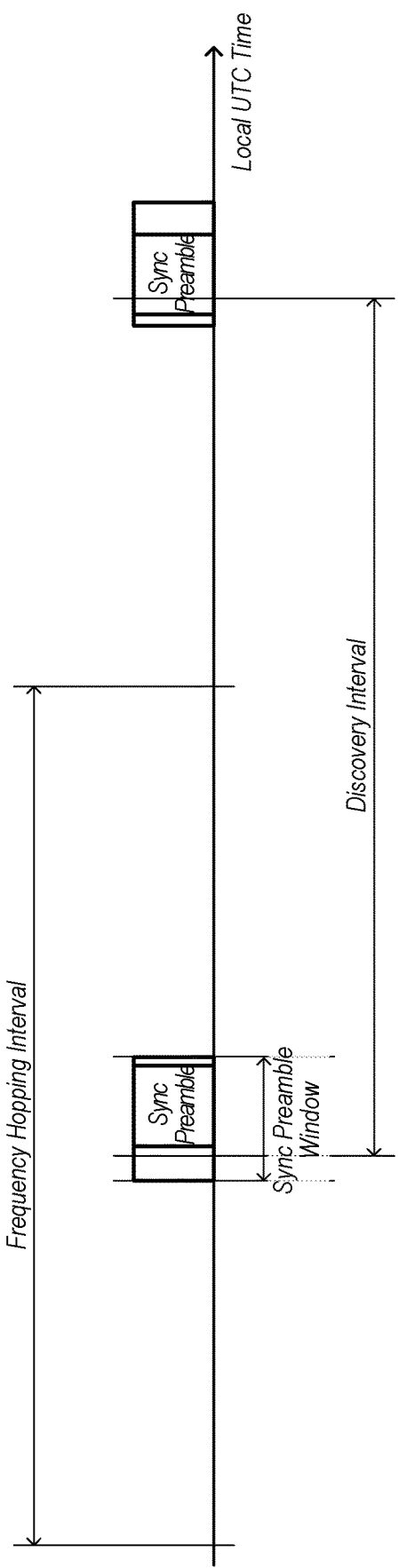
FIG. 6
FIG. 7

PRESENCE DISCOVERY TECHNIQUES

PRIORITY INFORMATION

This application claims priority to U.S. provisional patent application Ser. No. 62/868,364, entitled "Presence Discovery Techniques," filed Jun. 28, 2019, which is hereby incorporated by reference in its entirety as though fully and completely set forth herein.

TECHNICAL FIELD

The present application relates to wireless communication, including to techniques for performing presence discovery in a wireless communication system.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. Therefore, improvements in the field are desired.

SUMMARY

Embodiments are presented herein of, inter alia, systems, apparatuses, and methods for performing presence discovery in a wireless communication system.

As noted above, the number of use cases for different classes of wireless devices with widely variable capabilities and usage expectations are growing. While many wireless communication systems primarily utilize infrastructure mode type communications, e.g., in which one or more base stations and potentially a supporting network are used as intermediaries between endpoint devices, one possible use case for wireless communication includes direct device-to-device communications. This disclosure presents various techniques for supporting such communications, including features and techniques for performing device-to-device discovery communications using relatively narrow bandwidth communication channels, as well as techniques that can be used for discovery and/or other types of wireless communications more generally.

According to the techniques described herein, it may be possible to reduce the rate at which false positives occur when performing discovery detection, with relatively little impact to the rate at which actual discovery communications are detected. For example, one approach to reducing the false positive rate may include performing a frequency offset estimation consistency check when a candidate discovery signal is detected. It may be possible to identify many false positive candidates (e.g., which may be produced by interference or noise) using such a check since actual discovery communications may typically have a relatively small range of frequency offsets relative to such false positive candidates, so that candidate discovery signals with frequency offsets outside of that range may be reasonably classified as false positives, at least in some embodiments.

As another example, another approach to reducing the false positive rate may include performing a peak to sidelobe ratio check when a candidate discovery signal is detected. It may be possible to identify many false positive candidates using such a check since when an actual discovery communication is present, it may typically have a relatively high peak to sidelobe ratio, so that candidate discovery signals with peak to sidelobe ratios below a certain threshold may be reasonably classified as false positives, at least in some embodiments.

Such techniques may be used together, which may reduce the false positive rate more than if either technique were used individually, at least in some instances. Alternatively, such techniques may be used individually if desired. Reducing the false positive rate when detecting discovery communications using such techniques may be particularly beneficial for wireless communication scenarios in which long distance power constrained communications are desired, at least according to some embodiments.

In such scenarios, it may further be beneficial to increase the likelihood of successful detection of actual discovery communications. Accordingly, techniques are also described herein of possible approaches to performing timing acquisition and/or frequency offset estimation that may increase the accuracy of discovery signal detection, at least in some instances. These approaches may include iteratively refining timing acquisition estimates on the same set of signal samples, iteratively refining frequency offset estimates on the same set of signal samples, and/or iteratively refining timing acquisition estimates and frequency offset estimates in conjunction with each other, as possible examples.

The techniques described herein may be implemented in and/or used with a number of different types of devices, including but not limited to cellular phones, tablet computers, accessory and/or wearable computing devices, unmanned aerial vehicles, unmanned aerial controllers, automobiles and/or motorized vehicles, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIGS. 6-8 illustrate possible aspects and features of an exemplary possible narrowband device-to-device communication framework, according to some embodiments;

Figure 1:
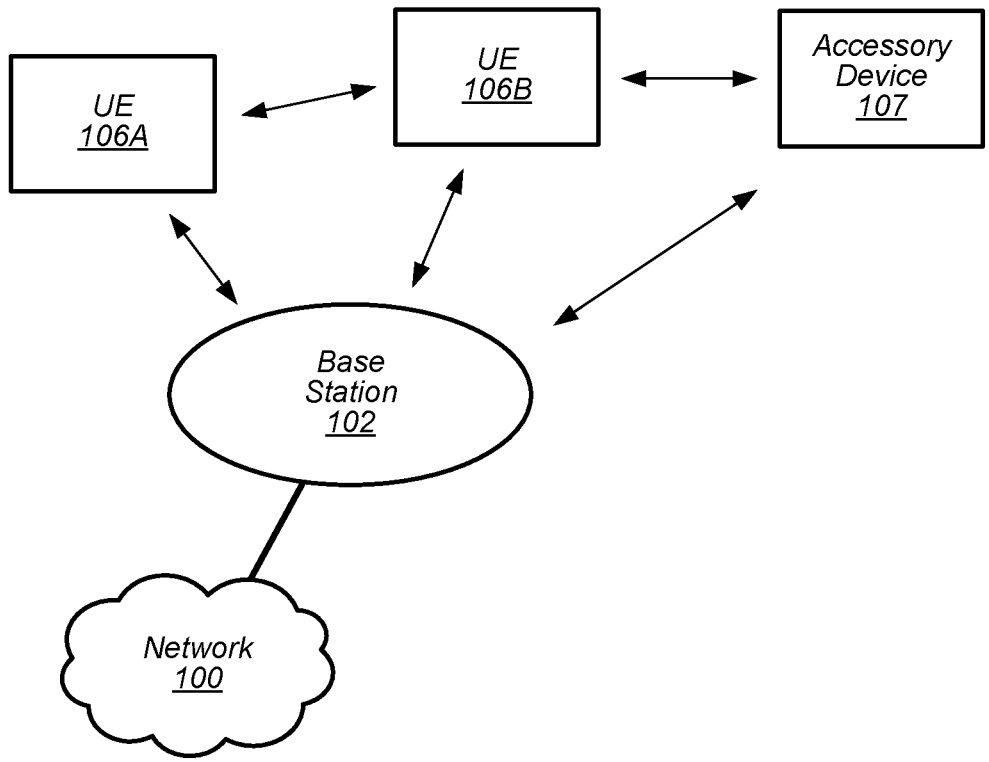
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
GSM: Global System for Mobile Communications
UMTS: Universal Mobile Telecommunications System
LTE: Long Term Evolution
IoT: Internet of Things
NB: Narrowband
D2D: device-to-device
OOC: out-of-coverage Terminology The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™ Gameboy Advance™, iPhone™), laptops, wearable devices (e.g. smart watch, smart glasses), PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well as any of various combinations of the above.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
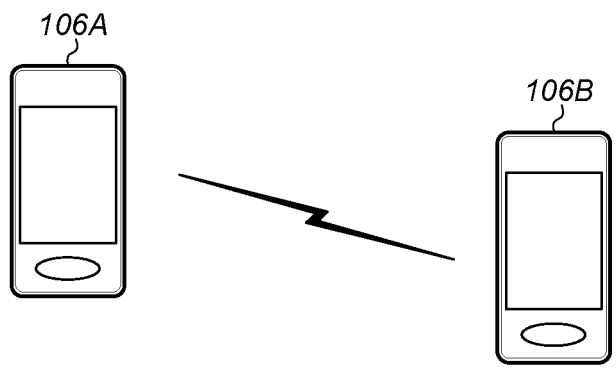
FIG. 2 illustrates an example wireless communication system in which two wireless devices can perform direct device-to-device communication, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware and/or software that enables wireless communication with the UE devices 106A, 106B, and 107. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1xRTT, 1xEV-DO, HRPD, eHRPD), Wi-Fi, etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. For example, according to at least some aspects of this disclosure, the UE 106A and UE 106B may be capable of arranging and performing D2D communication (e.g., including discovery communications) with each other even when out-of-coverage of the BS 102 and other cellular base stations.

FIG. 2 illustrates example UE devices 106A, 106B in D2D communication with each other. The UE devices 106A, 106B may be any of a mobile phone, a tablet, or any other type of hand-held device, a smart watch or other wearable device, a media player, a computer, a laptop, an unmanned aerial vehicle (UAV), an unmanned aerial controller (UAC), an automobile, or virtually any type of wireless device.

The UEs 106A, 106B may each include a device or integrated circuit for facilitating cellular communication, referred to as a cellular modem. The cellular modem may include one or more processors (processing elements) that is configured to execute program instructions stored in memory, and/or various hardware components as described herein. The UEs 106A, 106B may each perform any of the method embodiments described herein by executing such stored instructions. Alternatively, or in addition, the UEs 106A, 106B may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UEs 106A, 106B may include one or more antennas for communicating using one or more wireless communication protocols according to one or more RAT standards. In some embodiments, one or both of the UE 106A or UE 106B might be configured to communicate using a single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

Alternatively, the UE 106A and/or UE 106B may include two or more radios. For example, in some embodiments, the UE 106A and/or UE 106B may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106A and/or UE 106B may include a shared radio for communicating using either of LTE or CDMA2000 1xRTT (or LTE or NR, or LTE or GSM), and separate radios for communicating using each of Wi-Fi and BLUETOOTH™. Other configurations are also possible.

Figure 3:
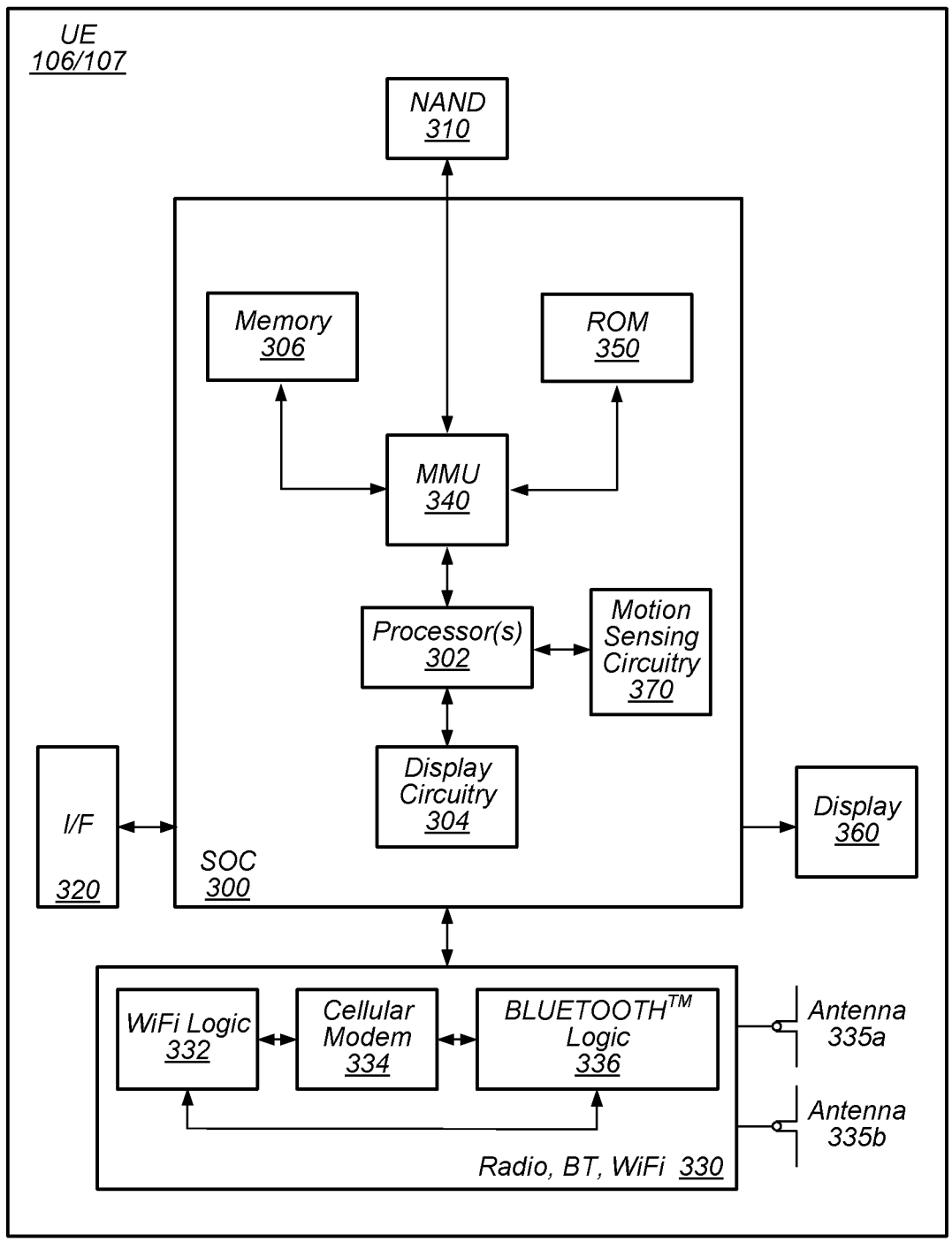
FIG. 3 is a block diagram illustrating an example wireless device, according to some embodiments.

FIG. 3—Block Diagram of a UE Device

FIG. 3 illustrates one possible block diagram of an UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310), and/or to other circuits or devices, such as the display circuitry 304, radio 330, I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using multiple wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. The processor(s) 302 of the UE device 106/107 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform discovery detection according to various embodiments disclosed herein. Processor(s) 302 may also implement various other applications and/or end-user applications running on UE 106. Alternatively or additionally, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
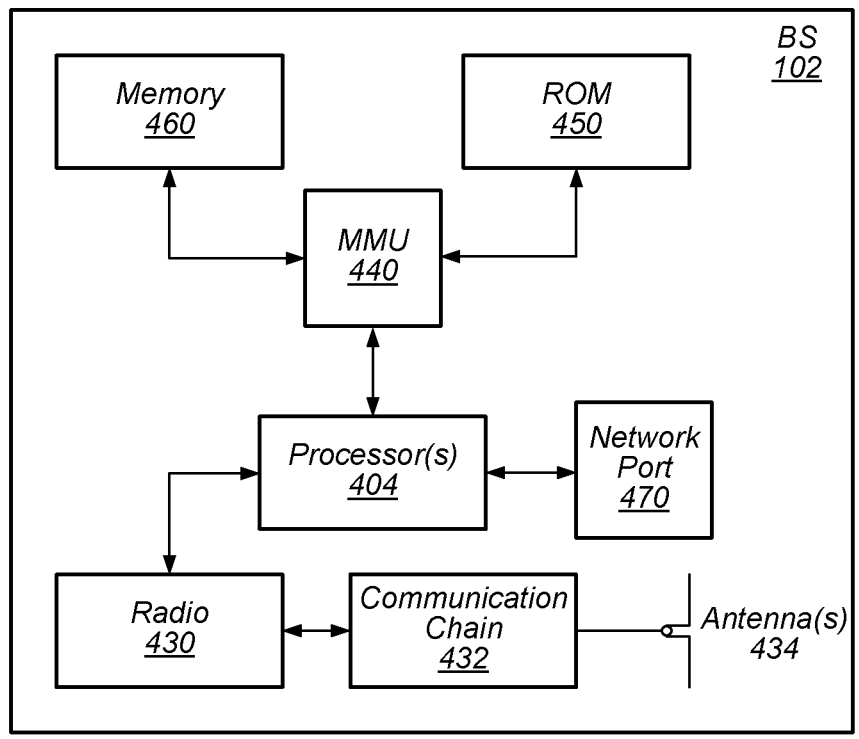
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and NR, LTE and Wi-Fi, LTE and UMTS, LTE and CDMA2000, UMTS and GSM, etc.).

As described further subsequently herein, the BS 102 may include hardware and software components for implementing or supporting implementation of features described herein. For example, while many of the features described herein relate to device-to-device communication that can be performed by UE devices without relying on an intermediary base station, a cellular base station may be configured to also be capable of performing device-to-device communication in accordance with the features described herein. As another possibility, the BS 102 may be instrumental in configuring a UE 106 to perform device-to-device communication according to the features described herein, and/or certain features described herein may be performed or not performed by a device based at least in part on whether there is a BS 102 providing cellular service within range of the device. According to some embodiments, the processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
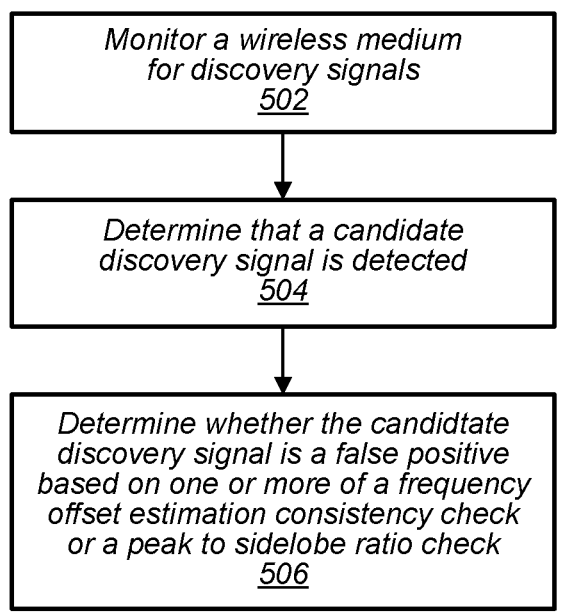
FIG. 5 is a communication flow diagram illustrating an exemplary method for performing presence discovery in a wireless communication system, according to some embodiments.

FIG. 5—Communication Flow Diagram

FIG. 5 is a communication flow diagram illustrating a method for performing presence discovery in a wireless communication system, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 5 may be implemented by a wireless device, such as the UEs 106A-B or 107 illustrated in and described with respect to FIGS. 1-3, or more generally in conjunction with any of the computer systems or devices shown in the above Figures, among other devices, as desired. Note that while at least some elements of the method of FIG. 5 are described in a manner relating to the use of communication techniques and/or features associated with LTE, and/or 3GPP specification documents, such description is not intended to be limiting to the disclosure, and aspects of the method of FIG. 5 may be used in any suitable wireless communication system, as desired. As shown, the method may operate as follows.

In 502, a wireless device may monitor a wireless medium for discovery signals. For example, the wireless device may act as a potential discovery responder attempting to determine if any discovery signals are being transmitted to the wireless device by another wireless device acting as a discovery initiator in a device-to-device (D2D) wireless communication framework. The wireless medium may include one or more Narrowband Internet of Things (NB-IoT) carriers, and/or may be any of various other possible (e.g., narrowband) carriers, at least according to some embodiments.

According to some embodiments, the wireless device may monitor the wireless medium during a "discovery period" or "discovery window" as defined within the wireless communication system framework. Monitoring the wireless medium for discovery signals could include correlating signals received on the wireless medium with one or more known discovery preamble signals, e.g., as specified by the wireless communication system, as one possibility.

In 504, the wireless device may determine that a candidate discovery signal is detected. In some instances, the wireless device may determine that multiple candidate discovery signals are detected during the discovery period or discovery window in which the wireless device is monitoring the wireless medium for discovery signals. Determining that a candidate discovery signal is detected may be performed in any of various possible ways. As one such possibility, the wireless device may determine that a candidate discovery signal is detected if correlating the signals received on the wireless medium with the known discovery preamble signals results in a correlation peak greater than a correlation peak threshold, e.g., for a specific set of signal samples.

In some embodiments, it may be possible to use an iterative approach to performing frequency offset estimation and/or time offset estimation for candidate discovery signals. Such an approach may improve the accuracy of candidate discovery signal detection, at least according to some embodiments.

For example, as a possible iterative approach to performing frequency offset estimation, the wireless device may obtain a first frequency offset estimate of a candidate discovery signal using a first number of neighboring samples, which may be a relatively small number of neighboring samples, e.g., that is selected to tolerate maximum possible impairment caused by the target estimate in the raw received signal, and to achieve a maximum parameter estimate range in the raw received signal, at least as one possibility. The received signal may be compensated using the first frequency offset estimate, and the wireless device may determine a second number of neighboring samples to use for a second frequency offset estimate on the same signals. The second number of neighboring samples may be larger than the first number of neighboring samples, e.g., to increase the estimation accuracy. The wireless device may then obtain a second (e.g., refined) frequency offset estimate of the compensated candidate discovery signal using the second number of neighboring samples. The wireless device may perform further iterations (e.g., further compensating the candidate discovery signal and increasing the number of neighboring samples used to perform the frequency offset estimate) as desired (or until the tunable range of the number of neighboring samples is reached), e.g., to further improve the estimation accuracy. In other words, the wireless device may obtain a frequency offset estimation for the candidate discovery signal, and iteratively refine the frequency offset estimation, where at each iteration, the candidate discovery signal is compensated by the frequency offset estimation from the previous iteration and an increased number of neighboring samples is used.

Similarly, as a possible iterative approach to performing time offset estimation, the wireless device may obtain a first time offset estimate of a candidate discovery signal using a first number of neighboring resource elements, which may be a relatively small number of neighboring resource elements, e.g., that is selected to tolerate maximum possible impairment caused by the target estimate in the raw received signal, and to achieve a maximum parameter estimate range in the raw received signal, at least as one possibility. The received signal may be compensated using the first time offset estimate, and the wireless device may determine a second number of neighboring resource elements to use for a second time offset estimate on the same signals. The second number of neighboring resource elements may be larger than the first number of neighboring resource elements, e.g., to increase the estimation accuracy. The wireless device may then obtain a second (e.g., refined) time offset estimate of the compensated candidate discovery signal using the second number of neighboring resource elements.

The wireless device may perform further iterations (e.g., further compensating the candidate discovery signal and increasing the number of neighboring resource elements used to perform the time offset estimate) as desired (or until the tunable range of the number of neighboring resource elements is reached), e.g., to further improve the estimation accuracy. In other words, the wireless device may obtain a time offset estimation for the candidate discovery signal, and iteratively refine the time offset estimation, where at each iteration, the candidate discovery signal is compensated by the time offset estimation from the previous iteration and an increased number of neighboring frequency resource elements is used.

As a still further possibility, a combined iterative time and frequency offset estimation approach could be used, if desired. For example, the wireless device could perform coarse timing acquisition for the candidate discovery signal, then perform coarse frequency offset estimation for the candidate discovery signal based on the coarse timing acquisition. As a further iteration, the wireless device could then perform fine timing acquisition for the candidate discovery signal based on the coarse frequency offset acquisition; and perform fine frequency offset estimation for the candidate discovery signal based on the fine timing acquisition. Thus, the coarse timing acquisition, coarse frequency offset estimation, fine timing acquisition, and fine frequency offset estimation, and potentially any desired number of further iterations of timing acquisition and frequency offset estimation, may be performed iteratively on the same set of signal samples of the candidate discovery signal.

Such an approach, which may be able to provide substantially improved estimation accuracy on a set of signal samples relative to a non-iterative approach, may be particularly useful in a D2D discovery scenario that could be performed at long range between power constrained devices (e.g., UEs), at least according to some embodiments. For example, in such a scenario, it may be the case that discovery transmissions are performed infrequently and at a relatively high power cost. Accordingly, techniques that can provide improved detection (including by providing more accurate time and/or frequency offset estimation) of a single discovery transmission, or can at least reduce the number of discovery signal repetitions needed to perform discovery, may beneficially reduce the power cost to the transmitting device (e.g., the discovery initiator) and the temporal delay to both peers to establish a D2D communication link.

It may also improve discovery performance in such a long range D2D communication scenario, e.g., in which noise and/or interference may be a common occurrence, to provide techniques to reduce the number of instances in which a wireless device determines that it has detected a discovery signal, but in which the detected discovery signal is not an actual discovery signal. Thus, in some embodiments, the wireless device may additionally or alternatively implement one or more techniques that can reduce this "false positive" (or "false alarm") rate when performing discovery.

In 506, the wireless device may determine whether the candidate discovery signal is a false positive based on one or more checks or tests. One such possible check may include a frequency offset estimation consistency check. Another such possible check may include a peak to sidelobe ratio check.

According to some embodiments, the frequency offset estimation consistency check may include determining whether an estimated frequency offset of the candidate discovery signal exceeds a frequency offset threshold. In some instances, multiple frequency offset estimates for the candidate discovery signal may be obtained, e.g., using different time lags. In such a case, it may be determined that the candidate discovery signal fails the frequency offset estimation check if the relative difference between different frequency offset estimates for the candidate discovery signal exceeds a relative frequency offset difference threshold, and that the candidate discovery signal passes the frequency offset estimation check if the relative difference between different frequency offset estimates for the candidate discovery signal does not exceed the relative frequency offset difference threshold. As another possibility, it may be determined that the candidate discovery signal fails the frequency offset estimation check if any of the frequency offset estimates for the candidate discovery signal exceeds an absolute frequency offset threshold, and that the candidate discovery signal passes the frequency offset estimation check if none of the frequency offset estimates for the candidate discovery signal exceeds the absolute frequency offset threshold.

According to some embodiments, the peak to sidelobe ratio check includes determining whether an estimated peak to sidelobe ratio of the candidate discovery signal exceeds a peak to sidelobe ratio threshold. For example, the wireless device may calculate a peak to sidelobe ratio for the candidate discovery signal, determine that the candidate discovery signal passes the peak to sidelobe ratio check if the peak to sidelobe ratio is greater than a peak to sidelobe ratio threshold, and determine that the candidate discovery signal fails the peak to sidelobe ratio check if the peak to sidelobe ratio is less than the peak to sidelobe ratio threshold.

As previously noted, the frequency offset estimation consistency check and the peak to sidelobe ratio check may be used individually or in combination (and potentially in combination with one or more other checks or tests, as desired). As one possibility, if they are used in combination, the wireless device may determine that the candidate discovery signal is a false positive if the candidate discovery signal fails either the frequency offset estimation consistency check or the peak to sidelobe ratio check, and may determine that the candidate discovery signal is an actual detected discovery signal if the candidate discovery signal passes both the frequency offset estimation consistency check and the peak to sidelobe ratio check. Other approaches are also possible.

As previously noted, in some instances, there may be multiple candidate discovery signals detected by the wireless device in some instances. In such a scenario, it may be the case that the wireless device determines whether each candidate discovery signal is a false positive or an actual detected discovery signal in a similar manner, e.g., by checking whether the candidate discovery signal passes a frequency offset estimation consistency check, a peak to sidelobe ratio check, and/or one or more other checks/tests, as desired.

In some embodiments, if the wireless device determines that a discovery signal is detected and is not a false positive, the wireless device may determine that an actual discovery signal has been detected. In such a case, the wireless device may respond to the discovery signal and/or otherwise proceed with further discovery signaling, e.g., in accordance with the discovery framework of the wireless communication system used by the wireless device. For example, a discovery response transmission could include a response to assist the discovery initiator to track the wireless device, and/or may include a connection request message, among various possibilities.

Note that while the method of FIG. 5 primarily relates to D2D communication between two wireless devices, similar techniques may be used to establish and communicate according to any number of additional D2D connections between wireless devices, and/or more generally for other types of presence discovery communications, among various possibilities. For example, the wireless device may utilize similar techniques to establish additional D2D connections with any number of wireless devices in parallel, and to communicate with those wireless devices according to those additional D2D connections. Further, at least some of the techniques described herein with respect to the method of FIG. 5 may be used in other wireless communication contexts (e.g., in addition to or as alternatives to D2D communication). For example, it may be possible that a wireless device could benefit from utilizing an iterative approach for time acquisition and/or frequency offset estimation in any of a variety of wireless communication systems, among various other possibilities.

FIGS. 6-13 and Additional Information

FIGS. 6-13 and the following additional information are provided as being illustrative of further considerations and possible implementation details relating to the method of FIG. 5, and are not intended to be limiting to the disclosure as a whole. Numerous variations and alternatives to the details provided herein below are possible and should be considered within the scope of the disclosure.

At least some existing wireless communication technologies include framework elements for device-to-device communication, also referred to as sidelink communication. For example, the 3GPP standards organization includes D2D/sidelink protocols such as Proximity Services (ProSe), e.g, in which in addition to synchronization signals transmitted in the central 6 RBs of the system bandwidth, discovery pool resources, sidelink control channel allocations, and sidelink shared channel allocations may be located in various other (e.g., outer) RBs of the system bandwidth over time. Such sidelink communication performed according to existing D2D protocols may encompass relatively wideband operation, e.g., encompassing at least 6 RBs (e.g., 1.4 MHz) and potentially up to 100 RBs (e.g., 20 MHz).

While such a potentially wideband D2D framework may be useful in some instances, in at least some instances, a more narrowband deployment may be advantageous. For example, for the transmit power regimes of many devices, propagation characteristics for narrowband communications may result in greater range capacity than wider-band communications. Note that effective communication range may be further increased, at least in some instances, if a lower-frequency communication band (e.g., 900 MHz unlicensed spectrum, as one possibility) is used for the narrowband D2D communications. As another possibility, some (e.g., lower complexity) devices may be configured to perform only narrowband communications (e.g., may have RF front end limitations, and/or may have battery limitations functionally limiting capability to perform wider-band communications). As yet another possibility, some devices, even if capable of both wideband and narrowband communication, may prefer to perform narrowband communication when possible, e.g., if the narrowband communication can reduce power consumption by the devices.

Accordingly, a narrowband (e.g., 180 kHz) D2D communication system may also or alternatively be used, at least according to some embodiments. Such techniques may be used in scenarios when one or more of the communicating wireless devices are not within communication range of a cellular base station (e.g., the devices may be OOC), according to some embodiments.

For example, such a system could be developed to provide long range peer-to-peer (P2P)/D2D communication, e.g., in absence of a wide area network (WAN) or WLAN radio connection, and to support a variety of possible features. At least according to some embodiments, such a system may support some or all of the features previously described herein with respect to FIG. 5.

According to some embodiments, such a system may operate in unlicensed low ISM bands, e.g., between 700 MHz and 1 GHz, for extended range purposes, and may use one or multiple carriers of approximately 200 kHz. Such a system may be designed to meet the local spectrum regulatory requirements, such as channel duty cycle, operating frequencies, hopping pattern, LBT, maximum transmit power, and occupied bandwidth.

As one possibility for providing the physical narrowband carrier for narrowband D2D communications, a NB-IoT carrier may be used. According to some embodiments, NB-IoT carriers may be configured for use in standalone deployments (e.g., in a repurposed GSM band), guardband deployments (e.g., in a guardband frequency between LTE carriers), and inband deployments (e.g., within an LTE carrier). Alternatively, it may be possible to utilize a NB-IoT carrier in an unlicensed frequency band. In any of these possible deployment modes, NB-IoT carriers may include a variety of key features. For example, among various possible characteristics, NB-IoT carriers may support flexible timelines for control and data channels; peak rates of approximately 20 kbps in the downlink and 60 kbps in the uplink may be supported; single tone (e.g., 3.75 KHz vs. 15 KHz) and multi tone (15 kHz) uplink modulation, using pi/2 binary phase shift keying or pi/4 quadrature phase shift keying may be used (quadrature phase shift keying may also be used in the downlink); single antenna, half duplex frequency division duplexing may be used; and/or a per-UE carrier bandwidth of 180 kHz may be used, according to some embodiments. Frequency hopping features for D2D communications may be supported. In some instances, NB-IoT carriers may provide coverage enhancement features for supporting coverage up to 20 dB. Alternatively, any number of other physical narrowband carriers may be used in a narrowband D2D communication system.

Any of a variety of features may be included in a D2D system, including when operating in regulated unlicensed spectrum, such as 900 MHz unlicensed spectrum. For example, frequency hopping spread spectrum (FHSS) may be used. Channel carrier frequencies may be separated by a minimum of 25 kHz, or the 20 dB bandwidth of the hopping channel, whichever is the greater. If the 20 dB bandwidth is less than 250 kHz (e.g., as may be the case if NB-IoT carriers are used), the system may use at least 50 channels. In this case, the average dwell time on a particular channel may not exceed 400 ms within a 20 second period (e.g., duty cycle <=2%), and/or transmit power may be limited to 30 dBm. If the 20 dB bandwidth is 250 kHz or greater, then the system may use at least 25 channels. In this case, the average dwell time may not exceed 400 ms within a 10 second period (e.g., duty cycle <=4%), and/or transmit power may be limited to 24 dBm. For example, the following table illustrates a possible set of specified features for a possible D2D communication system depending on the 20 dB bandwidth of the hopping channels used:

| BW | #Channel | TX Power | On Time | Dwell Time |
|---|---|---|---|---|
| <250 KHz | >=50 | 30 dBm | 400 ms | 20 sec |
| >250 KHz | >=25 | 24 dBm | 400 ms | 10 sec |

Thus, if the 900 MHz unlicensed spectrum band (US ISM 900, 902-918 MHz) is used in conjunction with NB-IoT carriers (e.g., each having 200 kHz including guard bands), it may be possible to configure a pool of 80 frequencies, as one exemplary possibility. In another configuration, a pool of 130 frequencies spanning 902-928 MHz may be possible. Other frequency pools, e.g., having other numbers of frequencies available, are also possible. Various sets of those frequencies may be configured as "scan channels" and "page channels", which may be used for discovery and/or other purposes, if desired.

As an example, FIG. 6 illustrates one possible interval structure that could be used for a synchronization preamble based framework for D2D communication. According to the illustrated interval structure, the overall time line structure may be based on UE local UTC time, composed of regular discovery intervals. Each discovery interval may have a predefined length (e.g., 720 ms, or any other desired length), and may have a start time based on a common UE ID that is known system-wide (or at least group wide). A hopping interval may have the same length as the discovery interval, and may have a predefined offset from the discovery interval (e.g., 360 ms, or any other desired offset).

As shown, the discovery interval may include 3 types of time resources: sync preambles, anchor preambles, and frequency hopping units (which may include one or multiple resource units).

Each sync preamble may have a predefined length (e.g., 50 ms, or any other desired length), and may be a preamble used for initial synchronization and data access for a new data session started with a discovery interval, without prior synchronization, according to some embodiments. In other words, a sync preamble may be transmitted by a UE at the start time of a discovery interval to start a new data session without prior synchronization. Some common sync preambles may be predefined for broadcast type services, such as presence discovery. A UE may also have its own dedicated sync preambles, which may hop at each hopping interval based on UE ID and UE local UTC time. For example, a pool of sync preambles may be divided into a certain number of groups (e.g., each associated with a sync ID), with each group including a certain number of synchronization sequences. A common sync ID set may thus have several sync IDs for common use, and a dedicated sync ID set may thus have the rest of the sync IDs that can be used for individual UEs. In such a case, the UE sync preamble hopping at each hopping interval may be among the dedicated sync ID set associated with the UE based on the UE ID and UE local UTC time. The frequency used for transmitting the sync preamble may also hop at each hopping interval based on UE ID and UE local UTC time.

The sync preamble window may be used for receiving a sync preamble transmitted by another UE. There may be multiple (e.g., 3, or another number) types of sync preamble windows, according to some embodiments. For example, a normal sync preamble window may be aligned with the start of a discovery interval, but with +/− normal drift room. The length of the normal sync preamble window may be equal to the sync preamble length plus double the normal drift room, as one possibility. A long sync preamble window may be a sync preamble window similarly aligned with the length of the discovery interval plus double the normal drift room. An extended sync preamble window may be a sync preamble window extended to multiple lengths of the discovery interval. For example, the length may be a number of multiples of the length of the discovery interval equal to a number of days that a UE has been out of GNSS coverage, as one possibility. Other values are also possible.

An anchor preamble may be a reference signal used for synchronization tracking and data access. An anchor preamble may be transmitted at the start time of a schedule interval to start a new data session with a UE with which synchronization has already been performed. According to some embodiments, an anchor preamble may be scrambled with a gold sequence based on UE ID and link ID. The sequences used for the anchor preamble can hop among a set of such sequences at each hopping interval, e.g., based on UE ID and UE local UTC time. The schedule interval may be the shortest configured packet exchange session length between peer UEs, according to the framework of FIG. 6, at least according to some embodiments. It may include a number of frequency hopping units, each of which may include one or multiple resource units. A data packet may span one or multiple frequency hopping units. A frequency hopping unit may the time unit for frequency hopping in a hopping interval. A resource unit may be a resource allocation unit as specified according to NB-IoT.

In the interval structure of FIG. 6, frequency hopping may be used at certain intervals. According to some embodiments, a system deployed according to such a framework may include a certain number of frequency channels (e.g., 63, as one possibility, or any other desired number), which may be randomly re-sequenced in every regular hopping interval based on the common UE ID and the local UTC time. Note that a schedule interval may be shared by one clock master and one clock slave, such that FH units in a schedule interval may follow the clock master's FH sequence, and the clock slave UE follows the clock master's timing and FH sequence for transmission and reception. Different schedule intervals can have the same or a different clock master and slave pair, at least according to some embodiments.

FIG. 7 further illustrates possible idle procedure aspects of such a framework as illustrated in FIG. 6, according to some embodiments. As shown, a UE in idle mode may perform a periodic search for related sync preambles in a normal sync preamble window, in every discovery interval, e.g., in order to receive sync preambles from UEs with UTC time difference from local UTC time of less than or equal to twice the normal drift room.

According to some embodiments, a wireless device participating in such a D2D communication scheme may be assigned a physical layer (PHY) synchronization identifier (sync ID). The PHY sync ID may represent a group of dedicated preamble sequences associated with the wireless device. One or more common preamble sequences may also be configured, e.g., for indicating certain common discovery messages. Thus, if 7 bit PHY sync IDs are used, 125 PHY sync IDs may be possible, representing 125 preamble groups. If each group is provided with 4 sequences, and 4 common sequences are provided, a total of 504 preamble sequences may be configured.

Figure 8:
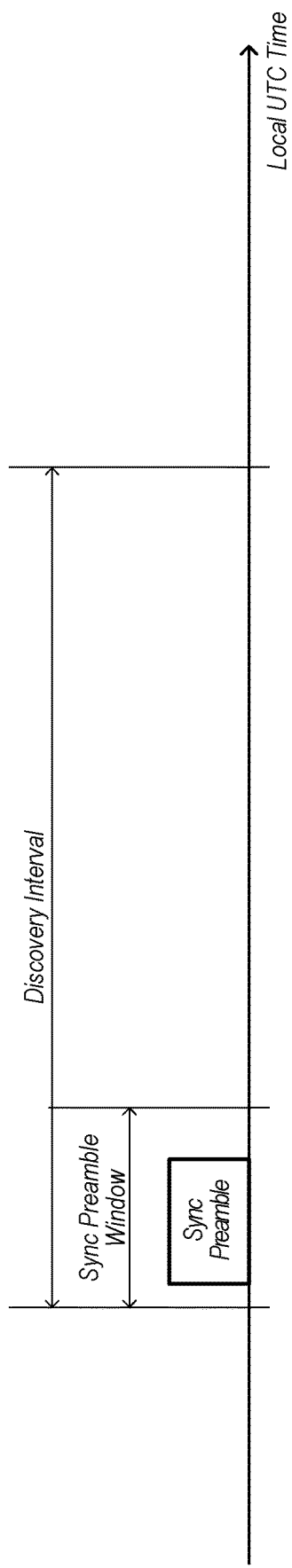

The sync preamble sequences may be used for initial symbol timing correction and carrier frequency offset (CFO) correction, as well as for sync preamble type detection (e.g., if applicable), and for PHY sync ID detection. FIG. 8 illustrates a sync preamble transmission within a sync preamble window of a discovery interval such as illustrated in FIG. 6. A wireless device that detects a preamble during such a D2D period may be able to determine if the preamble is a common preamble or one that is associated with its PHY sync ID (e.g., in which case the wireless device may further listen for one or more discovery messages) or is associated with another PHY sync ID (e.g., in which case the wireless device may continue DRX for the remainder of the D2D period). Once a discovery procedure is complete between two wireless devices, both the initiator UE and the receiver UE may be in a discovered state with respect to each other, and the wireless devices may be able to perform D2D data communication.

Thus, according to the communication framework of FIG. 6, as well as in many other D2D communication systems, discovery techniques may be an important part of the overall communication framework. The process of detecting whether a discovery initiator (DI) sends out a unique preamble sequence (e.g., during a discovery window) at a discovery responder (DR) may be referred to as presence discovery detection (PDD). At least in some instances, design metrics for PDD may include low mis-detection rates and low false alarm rates, e.g., to minimize system power use. The presence of false alarms could typically be caused by interference and/or noise. Accordingly, it may be useful to provide methods to minimize the false alarm rate when performing PDD, while maintaining a low mis-detection rate at the same time. Such methods may include an approach that is based on performing a frequency offset estimation consistency (FOEC) check, an approach that is based on performing a peak to sidelobe ratio (PSR) check, and/or an approach that is based on performing both a FOEC check and a PSR check.

In at least some embodiments, in the case of correctly detected discovery signals, the absolute frequency difference of the frequency offset estimation may be sufficiently low for most instances, such that a threshold could be defined that would exclude a substantial portion of false positive instances while excluding relatively few correctly detected discovery signals.

Additionally, at least in some embodiments, for a correct detection, frequency offset estimates from different methods (e.g., by choosing different time lags) may generally be consistent, while for a false alarm, different frequency offset estimates could vary significantly. Accordingly, one possible approach to performing a FOEC check may include performing default PDD per input sample, and performing additional PDD to obtain different frequency estimates (e.g., with different time lags) in case a potential peak is detected. This process may be repeated until the current preamble search window is finished. After the current preamble search window is finished (or as the search is performed, if desired), FOEC for each logged potential peak may be checked. If one of the potential peaks passes the FOEC check (e.g., and potentially if one or more other checks are passed), a discovery signal detection may be declared, while if none of the potential peaks passes the FOEC check, no detection may be declared.

The FOEC check may be performed in any of various ways. As one possibility, the relative difference between different frequency offset estimates for a potential peak may be checked against a certain threshold, such that if the relative difference exceeds the threshold, a FOEC failure is declared. Otherwise, a FOEC success may be declared. As another possibility, if one of the absolute frequency offset estimates exceeds a certain threshold, a FOEC failure may be declared. Otherwise, a FOEC success may be declared. Note that as a still further possibility, if desired, it may be the case that only one potential peak is retained during the entire preamble search window.

As noted previously herein, a peak to sidelobe ratio based approach to determining if a potential peak may be a false alarm may also or alternatively be used, if desired. Such an approach may be based on design requirements for discovery preamble signals to have strong autocorrelation properties, such that if an input to a PDD module includes a desired discovery signal, a single peak will appear. In contrast, in a pure interference scenario (e.g., in which all peaks represent false alarms), it may be the case that multiple sidelobes appear at different times in the discovery signal search window.

Based on such observations, it may be possible to design a PSR check such that during the presence discovery signal search window, a candidate peak list (e.g., those with the highest PDD metric(s)) is maintained. Alternatively, such a list could be built after the search window is finished, e.g., if intermediate results are stored. After the search window is finished, the PSR for one or multiple of the strongest peaks may be checked to determine whether the PSR exceeds a certain threshold. If the PSR does exceed the threshold, success (e.g., with respect to the PSR check) may be declared. Otherwise, a PDD failure may be declared.

Figure 9:
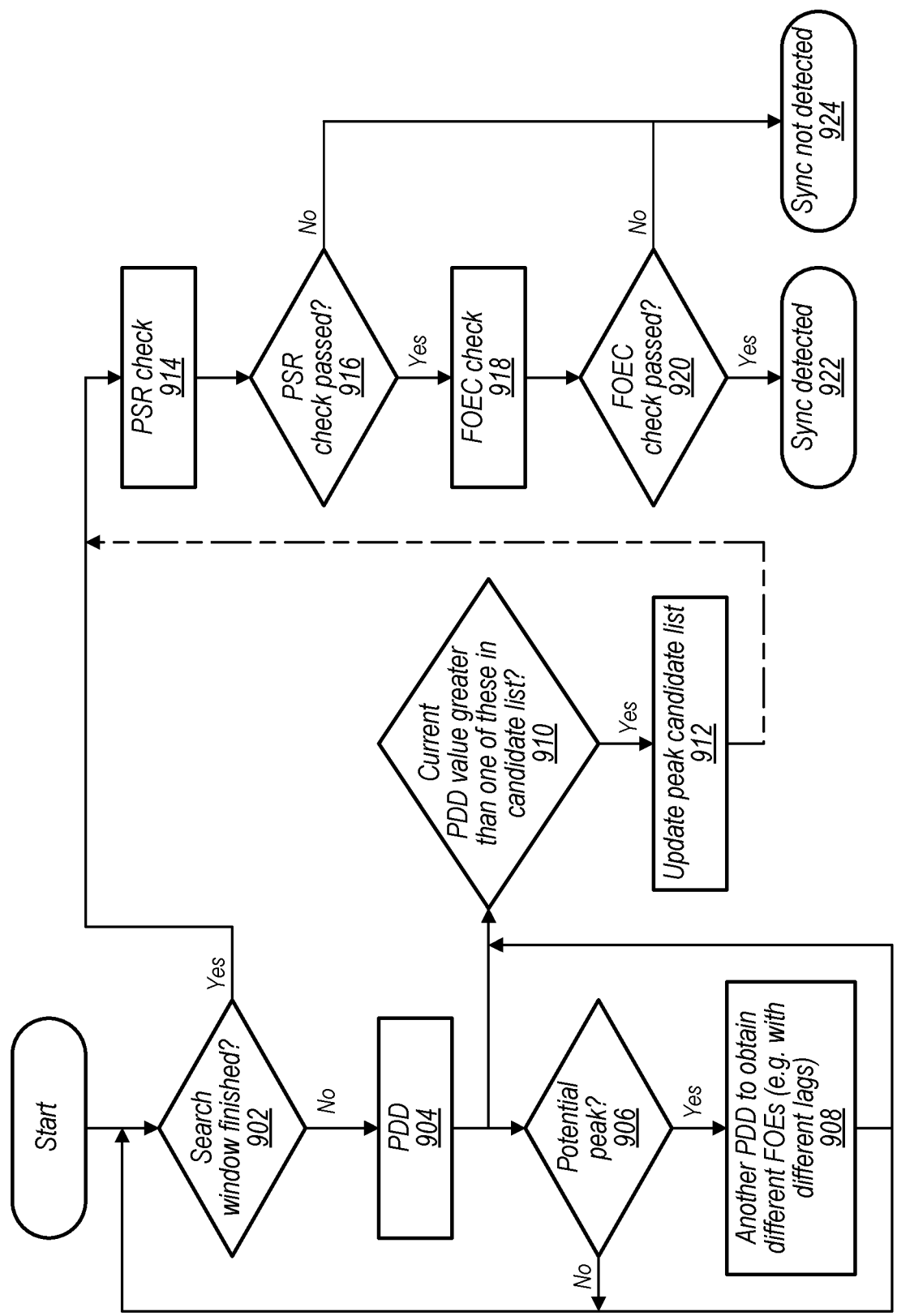
FIG. 9 is a flowchart diagram illustrating aspects of an exemplary method for performing presence discovery, in which a frequency offset error consistency check and a peak to sidelobe ratio check are used to reduce false positives, according to some embodiments.

As the FOEC and PSR based approaches may leverage different signal characteristics, it may also be possible to use a combined approach to reduce the false alarm rate further than if only one such approach were used. FIG. 9 is a flowchart diagram illustrating aspects of an exemplary such method for performing presence discovery, in which a frequency offset error consistency check and a peak to sidelobe ratio check are used to reduce false positives, according to some embodiments.

As shown, in 902, the method may include checking whether the current search window is finished. If not, in 904, the method may include performing PDD per input sample. In 906, it may be determined if a potential peak is detected, e.g., if the current PDD value is greater than a potential peak threshold. If a potential peak is detected, in 908, another PDD may be performed for the potential peak to obtain one or more different frequency offset estimations (e.g., with different time lags). Additionally, in 910, it may be determined if the current PDD value is greater than that of a candidate peak in a candidate peak list. If so, in 912, the peak candidate list may be updated to include the current candidate peak (e.g., including any additional frequency offset estimates obtained for the candidate peak). These steps may be repeated through the end of the search window. Once the search window is finished, in 914, a PSR check may be performed per logged potential peak, or possibly for the peak with the maximum PDD value among logged peaks, or possibly for a portion of those logged potential peaks. In 916, it may be determined if each candidate peak being PSR checked passes the PSR check. If no candidate peak passes the PSR check, in 924, it may be determined that no discovery synchronization signals are detected. If at least one candidate peak passes the PSR check, in 918, a FOEC check may be performed on the candidate peak(s) that pass the PSR check. In 920, it may be determined if each candidate peak being FOEC checked passes the FOEC check. If no candidate peak passes the FOEC check, in 924, it may be determined that no discovery synchronization signals are detected. In 922, a detection may be declared if a candidate peak passes the FOEC check as well as the PSR check.

At least in some scenarios, PDD performance may be substantially improved by use of such false alarm mitigation techniques.

In wireless communication systems, parameter estimation may play an important role. The accuracy of such estimation could directly affect the achievable key performance indicators (KPI), such as data throughput. Accordingly, an iterative parameter estimation approach which may improve parameter estimation accuracy (e.g., compared to a non-iterative approach) may be used herein, e.g., in conjunction with the other techniques described herein or independently, according to some embodiments. Such an approach may be used for iterative time offset estimation, iterative frequency offset estimation, combined iterative time offset and frequency offset estimation, and/or any of various other parameter estimation scenarios.

Figure 10:
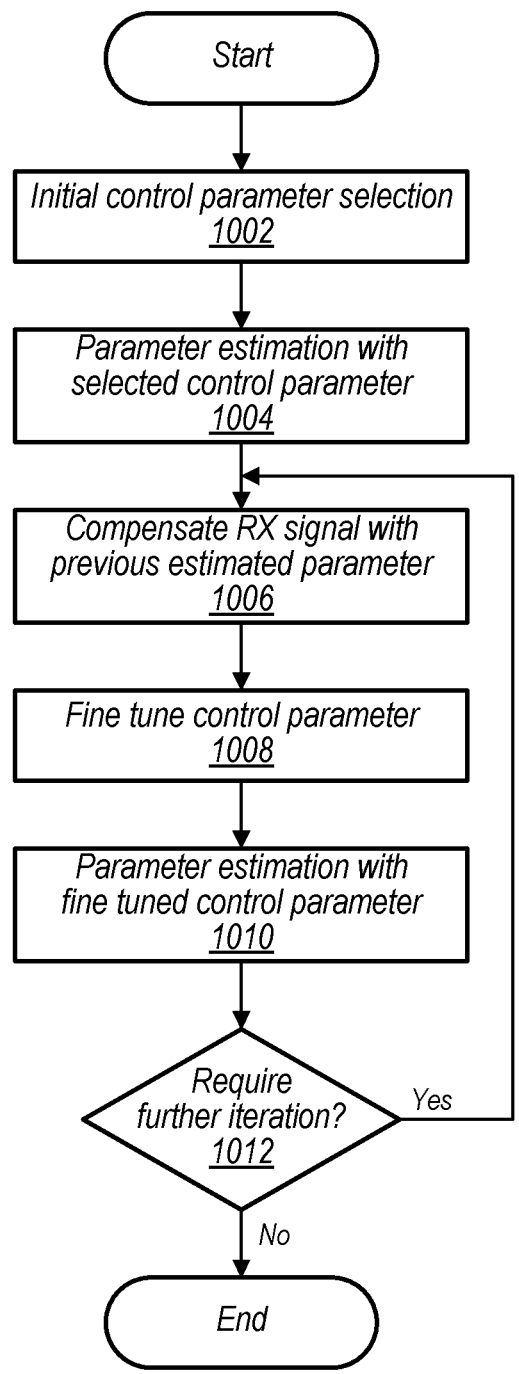
FIG. 10 is a flowchart diagram illustrating aspects of an exemplary method for performing iterative parameter estimation, according to some embodiments.

FIG. 10 is a flowchart diagram illustrating aspects of an exemplary method for performing iterative parameter estimation, according to some embodiments. To estimate parameters (e.g., frequency offset, time offset), the received signal, which may be corrupted by the estimated parameters together with noise and/or interference, may be analyzed. During the received signal analysis, some control parameters may be selected for the estimator, using such considerations as the possible signal impairment caused by the target estimated parameter(s), the range of the estimated parameter(s), and the achievable accuracy of the parameter estimation. There may typically be trade-offs in these considerations for different control parameter values.

According to the method of FIG. 10, in 1002, initial control parameter selection may be performed. The initial control parameter selection may include selection of control parameters set to tolerate maximum possible impairment caused by the target estimate in the raw received signal, and to achieve maximum parameter estimate range in the raw received signal. In 1004, parameter estimation may be performed with the selected control parameter(s). In 1006, the received signal may be compensated by the estimated parameter from the previous iteration. In 1008, a next iteration may begin, in which the control parameter(s) may be fine tuned, for example by adjusting the control parameter(s) to tolerate maximum possible impairment within the compensated received signal, and to achieve maximum parameter estimate range within the compensated received signal. In 1010, parameter estimation may be performed with the fine tuned control parameter(s). In 1012, it may be determined whether one or more further iterations are required or desired. If so, the method may return to step 1006. If not, the iterative parameter estimation may be complete. The iterations may continue until a certain threshold of estimation accuracy is reached or the tunable range of the control parameter(s) is reached, as one possibility. At least in some embodiments, the control parameter refinement may be set to achieve better estimation accuracy at each iteration, e.g., since the required estimation range and maximum impairment caused by the target parameter may be reduced significantly after compensating the signal by the parameter estimation of the previous iteration.

Figure 11:
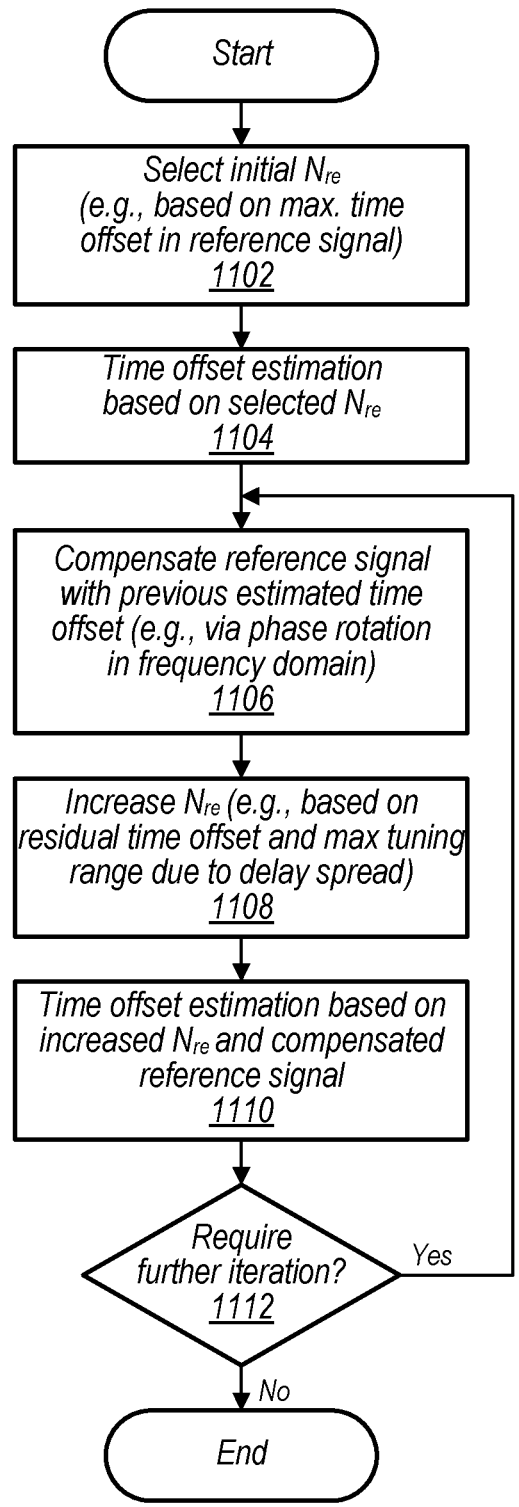
FIG. 11 is a flowchart diagram illustrating aspects of an exemplary method for performing iterative time offset estimation, according to some embodiments.

FIG. 11 is a flowchart diagram illustrating aspects of an exemplary method for performing iterative parameter estimation, in which the parameter being estimated is time offset, according to some embodiments. Time offset estimation may be carried out in the frequency domain during a data communication session, in some embodiments. To smooth out the noise/interference impact, neighboring frequency resource elements may be averaged before differential coherent combining for the time offset estimate. Thus, the number of neighboring frequency resource elements ($N_{re}$) may be used as a control parameter. This parameter may impact the estimator such that a larger value of $N_{re}$ may provide a more accurate estimate by allowing for more noise/interference suppression, but may also reduce the achievable estimation range. Also, the average signal strength can be degraded during averaging, e.g., due to different phase caused by the time offset.

According to the method of FIG. 11, in 1102, an initial $N_{re}$ value may be selected, e.g., based on the maximum time offset in the reference signal, if available). In 1104, time offset estimation may be performed with the selected $N_{re}$ value. In 1106, the reference signal may be compensated by the estimated time offset from the previous iteration, e.g., via phase rotation in the frequency domain. In 1108, $N_{re}$ may be increased, for example by an amount selected based on the residual time offset and maximum tuning range due to the delay spread. In 1110, time offset estimation may be performed with the increased $N_{re}$ value. In 1112, it may be determined whether one or more further iterations are required or desired. If so, the method may return to step 1106. If not, the iterative time offset estimation may be complete. The iterations may continue until a certain threshold of estimation accuracy is reached or the tunable range of $N_{re}$ is reached, as one possibility.

Figure 12:
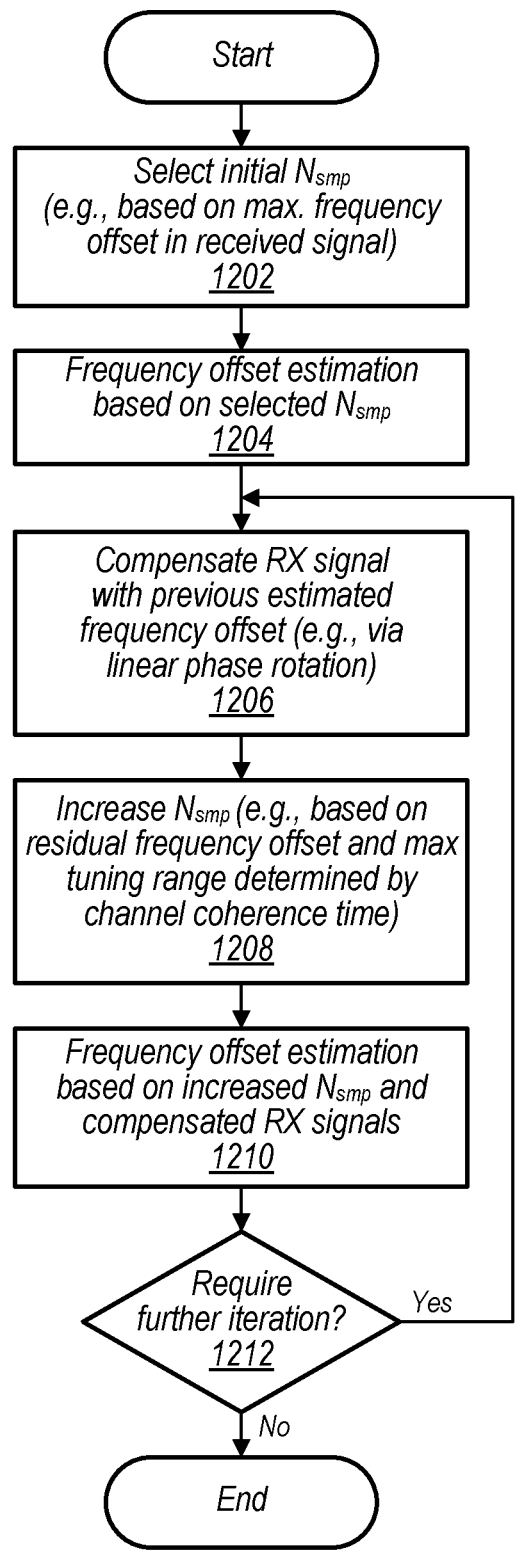
FIG. 12 is a flowchart diagram illustrating aspects of an exemplary method for performing iterative frequency offset estimation, according to some embodiments.

FIG. 12 is a flowchart diagram illustrating aspects of an exemplary method for performing iterative parameter estimation, in which the parameter being estimated is frequency offset, according to some embodiments. Frequency offset estimation may be carried out in the time domain during initial synchronization, in some embodiments. To smooth out the noise/interference impact, neighboring samples may be averaged before differential coherent combining over the averaged samples. Thus, the number of neighboring samples ($N_{smp}$) may be used as a control parameter. This parameter may impact the estimator such that a larger value of $N_{smp}$ may provide a more accurate estimate by allowing for more noise/interference suppression, but may also reduce the achievable estimation range. Also, the average signal strength can be degraded during averaging, e.g., due to different phase rotation in different samples caused by the frequency offset.

According to the method of FIG. 12, in 1202, an initial $N_{smp}$ value may be selected, e.g., based on the maximum frequency offset in the received signal). In 1204, frequency offset estimation may be performed with the selected $N_{smp}$ value. In 1206, the reference signal may be compensated by the estimated frequency offset from the previous iteration, e.g., via linear phase rotation. In 1208, $N_{smp}$ may be increased, for example by an amount selected based on the residual frequency offset and maximum tuning range determined by channel coherence time. In 1210, frequency offset estimation may be performed with the increased $N_{smp}$ value. In 1212, it may be determined whether one or more further iterations are required or desired. If so, the method may return to step 1206. If not, the iterative frequency offset estimation may be complete. The iterations may continue until a certain threshold of estimation accuracy is reached or the tunable range of $N_{smp}$ is reached, as one possibility.

Thus, use of such an iterative approach may allow for a more accurate parameter estimation on a given set of signal samples, at least according to some embodiments. For example, the residual frequency error may be significantly reduced after the second iteration in comparison to after the first iteration when using such an approach for frequency offset estimation, at least in some instances.

Figure 13:
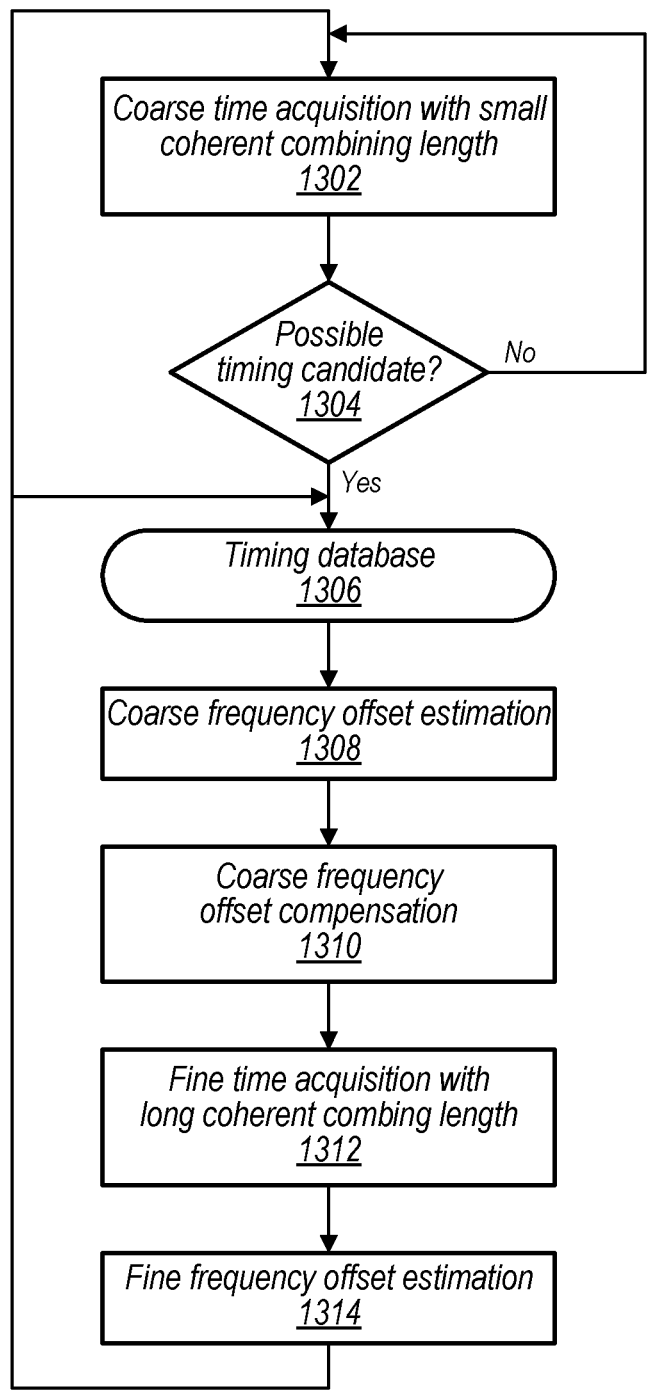
FIG. 13 is a flowchart diagram illustrating aspects of an exemplary method for performing iterative time and frequency offset estimation, according to some embodiments.

Still further, it may be possible to utilize an iterative approach to performing combined timing and frequency estimation, at least in some embodiments. FIG. 13 is a flowchart diagram illustrating aspects of such an exemplary method for performing iterative time and frequency offset estimation, according to some embodiments. According to the method of FIG. 13, in 1302, coarse timing acquisition with a small coherent combining length (e.g., due to consideration of a worst possible frequency offset for the signal) may be performed on a received signal. In 1304, it may be determined whether the coarse timing acquisition results in a possible correct timing candidate. If not, the method may return to step 1302. If so, the method may proceed to 1306, in which the timing candidate may be added to a timing database. Proceeding to step 1308, coarse frequency offset estimation may be performed based on the current coarse timing hypothesis. In 1310, the received signal may be compensated based on the current coarse frequency and time offset hypothesis. In 1312, fine timing acquisition may be performed, e.g., with a larger coherent combining length, based on the frequency compensated signal. In 1314, fine frequency offset estimation may be performed based on the refined timing estimation. The timing database may be updated with the refined timing and frequency offset estimation, and the method may return to step 1302 for further timing candidate detection.

As previously noted herein, such an iterative approach to performing parameter estimation may provide improved accuracy relative to a non-iterative approach, at least in some instances. While in some scenarios it may be possible to refine parameter estimations (e.g., over time using different signals) even using a non-iterative approach, it may also be the case that obtaining such improved accuracy on a single set of signal samples may be particularly beneficial in scenarios in which signals on which to perform parameter estimation are of more limited availability. For example, as also previously noted, when performing discovery or other communications between power constrained (e.g., UE) devices at relatively long range, improvements in parameter estimation at each instance of signal reception may be particularly beneficial, e.g., to improve the likelihood of correctly detecting a discovery signal and/or to reduce the need for transmission repetitions that may come at a high power cost and/or that may increase connection setup delays, at least according to some embodiments. Further, it may be desirable to improve parameter estimation accuracy by use of such an iterative approach even in scenarios in which synchronization signals, reference signals, and/or other signals on which to perform parameter estimation are more readily available, at least according to some embodiments.

In the following further exemplary embodiments are provided.

One set of embodiments may include a method, comprising: by a first wireless device: monitoring a wireless medium for discovery signals; determining that a candidate discovery signal is detected; performing a frequency offset estimation consistency check on the candidate discovery signal; performing a peak to sidelobe ratio check for the candidate discovery signal; and determining whether the candidate discovery signal is a false positive based at least in part on the frequency offset estimation consistency check and the peak to sidelobe ratio check.

According to some embodiments, the frequency offset estimation consistency check includes determining whether an estimated frequency offset of the candidate discovery signal exceeds a frequency offset threshold.

According to some embodiments, the peak to sidelobe ratio check includes determining whether an estimated peak to sidelobe ratio of the candidate discovery signal exceeds a peak to sidelobe ratio threshold.

According to some embodiments, the method further comprises: determining that the candidate discovery signal is a false positive if the candidate discovery signal fails either the frequency offset estimation consistency check or the peak to sidelobe ratio check; determining that the candidate discovery signal is an actual detected discovery signal if the candidate discovery signal passes both the frequency offset estimation consistency check and the peak to sidelobe ratio check.

According to some embodiments, the method further comprises: obtaining a frequency offset estimation for the candidate discovery signal; and iteratively refining the frequency offset estimation for the candidate discovery signal, wherein at each iteration, the candidate discovery signal is compensated by the frequency offset estimation from the previous iteration and an increased number of neighboring time samples is used.

According to some embodiments, the method further comprises: obtaining a time offset estimation for the candidate discovery signal; and iteratively refining the time offset estimation for the candidate discovery signal, wherein at each iteration, the candidate discovery signal is compensated by the time offset estimation from the previous iteration and an increased number of neighboring frequency resource elements is used.

According to some embodiments, the candidate discovery signal comprises a device-to-device (D2D) discovery signal, wherein monitoring the wireless medium for discovery signals further comprises correlating signals received on the wireless medium with one or more known D2D discovery preamble signals; wherein determining that a candidate discovery signal is detected further comprises determining that correlating signals received on the wireless medium with the one or more known D2D discovery preamble signals results in a correlation peak greater than a correlation peak threshold.

Another set of embodiments may include an apparatus, comprising: a processor configured to cause a wireless device to: monitor a wireless medium for discovery signals; determine that a candidate discovery signal is detected; perform a frequency offset estimation consistency check on the candidate discovery signal; and determine whether the candidate discovery signal is a false positive based at least in part on the frequency offset estimation consistency check.

According to some embodiments, to perform the frequency offset estimation consistency check, the processor is further configured to cause the wireless device to: obtain multiple frequency offset estimates for the candidate discovery signal using different time lags; determine that the candidate discovery signal fails the frequency offset estimation check if the relative difference between different frequency offset estimates exceeds a relative frequency offset difference threshold; and determine that the candidate discovery signal passes the frequency offset estimation check if the relative difference between different frequency offset estimates does not exceed the relative frequency offset difference threshold.

According to some embodiments, to perform the frequency offset estimation consistency check, the processor is further configured to cause the wireless device to: obtain multiple frequency offset estimates for the candidate discovery signal using different time lags; determine that the candidate discovery signal fails the frequency offset estimation check if any of the frequency offset estimates for the candidate discovery signal exceeds an absolute frequency offset threshold; and determine that the candidate discovery signal passes the frequency offset estimation check if none of the frequency offset estimates for the candidate discovery signal exceeds the absolute frequency offset threshold.

According to some embodiments, the processor is further configured to cause the wireless device to: perform a peak to sidelobe ratio check for the candidate discovery signal; and determine whether the candidate discovery signal is a false positive further based at least in part on the peak to sidelobe ratio check for the candidate discovery signal.

According to some embodiments, to perform the peak to sidelobe ratio check, the processor is further configured to cause the wireless device to: calculate a peak to sidelobe ratio for the candidate discovery signal; determine that the candidate discovery signal passes the peak to sidelobe ratio check if the peak to sidelobe ratio is greater than a peak to sidelobe ratio threshold; and determine that the candidate discovery signal fails the peak to sidelobe ratio check if the peak to sidelobe ratio is less than the peak to sidelobe ratio threshold.

According to some embodiments, the processing element is further configured to cause the wireless device to: obtain a first frequency offset estimate of the candidate discovery signal using a first number of neighboring samples; compensate the candidate discovery signal using the first frequency offset estimate; determine a second number of neighboring samples to use for a second frequency offset estimate, wherein the second number of neighboring samples is larger than the first number of neighboring samples; and obtain the second frequency offset estimate of the compensated candidate discovery signal using the second number of neighboring samples.

According to some embodiments, the processor is further configured to cause the wireless device to: obtain a first time offset estimate of the candidate discovery signal using a first number of neighboring frequency resource elements; compensate the candidate discovery signal using the first time offset estimate; determine a second number of neighboring frequency resource elements to use for a second time offset estimate, wherein the second number of neighboring frequency resource elements is larger than the first number of neighboring frequency resource elements; and obtain the second time offset estimate of the compensated candidate discovery signal using the second number of neighboring frequency resource elements.

Still another set of embodiments may include a wireless device, comprising: an antenna; a radio operably coupled to the antenna; and a processor operably coupled to the radio; wherein the wireless device is configured to: monitor a wireless medium for discovery signals; determine that a candidate discovery signal is detected; perform coarse timing acquisition for the candidate discovery signal; perform coarse frequency offset estimation for the candidate discovery signal based on the coarse timing acquisition; perform fine timing acquisition for the candidate discovery signal based on the coarse frequency offset acquisition; and perform fine frequency offset estimation for the candidate discovery signal based on the fine timing acquisition.

According to some embodiments, the coarse timing acquisition, coarse frequency offset estimation, fine timing acquisition, and fine frequency offset estimation are performed iteratively on a same set of signal samples.

According to some embodiments, the wireless device is further configured to: perform a frequency offset estimation consistency check on the candidate discovery signal; and determine whether the candidate discovery signal is a false positive based at least in part on the frequency offset estimation consistency check.

According to some embodiments, the wireless device is further configured to: perform a peak to sidelobe ratio check for the candidate discovery signal; and determine whether the candidate discovery signal is a false positive based at least in part on the peak to sidelobe ratio check.

According to some embodiments, the wireless device is further configured to: determine that multiple candidate discovery signals are detected; and perform coarse timing acquisition, coarse frequency offset estimation, fine timing acquisition, and fine frequency offset estimation iteratively on a same set of signal samples for each of the multiple candidate discovery signals.

According to some embodiments, the wireless device is further configured to: determine that multiple candidate discovery signals are detected; perform one or more of a frequency offset estimation consistency check or a peak to sidelobe ratio check on each of the multiple candidate discovery signals; and determine whether each of the candidate discovery signal is a false positive based at least in part on one or more of the frequency offset estimation consistency check or the peak to sidelobe ratio check.

Yet another exemplary embodiment may include a method, comprising: by a wireless device: performing any or all parts of the preceding examples.

Another exemplary embodiment may include a wireless device, comprising: an antenna; a radio coupled to the antenna; and a processing element operably coupled to the radio, wherein the device is configured to implement any or all parts of the preceding examples.

Still another exemplary embodiment may include an apparatus, comprising: a processing element configured to cause a wireless device to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
    by a first wireless device:
    monitoring a wireless medium for discovery signals;
    determining that a candidate discovery signal is detected;
    performing a frequency offset estimation consistency check on the candidate discovery signal;
    performing a peak to sidelobe ratio check on the candidate discovery signal; and
    determining whether the candidate discovery signal is a false positive based at least in part on the frequency offset estimation consistency check and the peak to sidelobe ratio check.

2. The method of claim 1,
    wherein the frequency offset estimation consistency check includes determining whether an estimated frequency offset of the candidate discovery signal exceeds a frequency offset threshold.

3. The method of claim 1,
    wherein the peak to sidelobe ratio check includes determining whether an estimated peak to sidelobe ratio of the candidate discovery signal exceeds a peak to sidelobe ratio threshold.

4. The method of claim 1, wherein the method further comprises:
    determining that the candidate discovery signal is a false positive if the candidate discovery signal fails either the frequency offset estimation consistency check or the peak to sidelobe ratio check; and
    determining that the candidate discovery signal is an actual detected discovery signal if the candidate discovery signal passes both the frequency offset estimation consistency check and the peak to sidelobe ratio check.

5. The method of claim 1, wherein the method further comprises:
    obtaining a frequency offset estimation for the candidate discovery signal; and
    iteratively refining the frequency offset estimation for the candidate discovery signal,
    wherein at each iteration, the candidate discovery signal is compensated by the frequency offset estimation from a previous iteration and an increased number of neighboring time samples is used.

6. The method of claim 1, wherein the method further comprises:
    obtaining a time offset estimation for the candidate discovery signal; and
    iteratively refining the time offset estimation for the candidate discovery signal,
    wherein at each iteration, the candidate discovery signal is compensated by the time offset estimation from the previous iteration and an increased number of neighboring frequency resource elements is used.

7. The method of claim 1,
    wherein the candidate discovery signal comprises a device-to-device (D2D) discovery signal,
    wherein monitoring the wireless medium for discovery signals further comprises correlating signals received on the wireless medium with one or more known D2D discovery preamble signals; and
    wherein determining that a candidate discovery signal is detected further comprises determining that correlating signals received on the wireless medium with the one or more known D2D discovery preamble signals results in a correlation peak greater than a correlation peak threshold.

8. An apparatus, comprising:
    a processor configured to cause a wireless device to:
    monitor a wireless medium for discovery signals;
    determine that a candidate discovery signal is detected;
    determine a first estimated frequency offset of the candidate discovery signal;
    perform a frequency offset estimation consistency check on the candidate discovery signal based on a comparison of the first estimated frequency offset of the candidate discovery signal to a threshold; and
    determine whether the candidate discovery signal is a false positive based at least in part on the frequency offset estimation consistency check.

9. The apparatus of claim 8, wherein to perform the frequency offset estimation consistency check, the processor is further configured to cause the wireless device to:
    obtain multiple frequency offset estimates for the candidate discovery signal using different time lags;
    determine that the candidate discovery signal fails the frequency offset estimation check if a relative difference between different frequency offset estimates exceeds a relative frequency offset difference threshold; and
    determine that the candidate discovery signal passes the frequency offset estimation check if the relative difference between different frequency offset estimates does not exceed the relative frequency offset difference threshold.

10. The apparatus of claim 8, wherein to perform the frequency offset estimation consistency check, the processor is further configured to cause the wireless device to:
    obtain multiple frequency offset estimates for the candidate discovery signal using different time lags;
    determine that the candidate discovery signal fails the frequency offset estimation check if any of the frequency offset estimates for the candidate discovery signal exceeds an absolute frequency offset threshold; and
    determine that the candidate discovery signal passes the frequency offset estimation check if none of the frequency offset estimates for the candidate discovery signal exceeds the absolute frequency offset threshold.

11. The apparatus of claim 8, wherein the processor is further configured to cause the wireless device to:
    perform a peak to sidelobe ratio check for the candidate discovery signal; and determine whether the candidate discovery signal is a false positive further based at least in part on the peak to sidelobe ratio check for the candidate discovery signal.

12. The apparatus of claim 11, wherein to perform the peak to sidelobe ratio check, the processor is further configured to cause the wireless device to:
calculate a peak to sidelobe ratio for the candidate discovery signal;
determine that the candidate discovery signal passes the peak to sidelobe ratio check if the peak to sidelobe ratio is greater than a peak to sidelobe ratio threshold; and
determine that the candidate discovery signal fails the peak to sidelobe ratio check if the peak to sidelobe ratio is less than the peak to sidelobe ratio threshold.

13. The apparatus of claim 8, wherein the first estimated frequency offset of the candidate discovery signal is based on a first number of neighboring samples, wherein the processor is further configured to cause the wireless device to:
compensate the candidate discovery signal using the first frequency offset estimate;
determine a second number of neighboring samples to use for a second frequency offset estimate, wherein the second number of neighboring samples is larger than the first number of neighboring samples; and
obtain the second frequency offset estimate of the compensated candidate discovery signal using the second number of neighboring samples.

14. The apparatus of claim 8, wherein the processor is further configured to cause the wireless device to:
obtain a first time offset estimate of the candidate discovery signal using a first number of neighboring frequency resource elements;
compensate the candidate discovery signal using the first time offset estimate;
determine a second number of neighboring frequency resource elements to use for a second time offset estimate, wherein the second number of neighboring frequency resource elements is larger than the first number of neighboring frequency resource elements; and
obtain the second time offset estimate of the compensated candidate discovery signal using the second number of neighboring frequency resource elements.

15. A wireless device, comprising:
an antenna;
a radio operably coupled to the antenna; and
a processor operably coupled to the radio;
wherein the wireless device is configured to:
monitor a wireless medium for discovery signals;
determine that a candidate discovery signal is detected;
perform coarse timing acquisition for the candidate discovery signal;
perform coarse frequency offset estimation for the candidate discovery signal based on the coarse timing acquisition;
perform fine timing acquisition for the candidate discovery signal based on the coarse frequency offset estimation; and
perform fine frequency offset estimation for the candidate discovery signal based on the fine timing acquisition.

16. The wireless device of claim 15,
wherein the coarse timing acquisition, coarse frequency offset estimation, fine timing acquisition, and fine frequency offset estimation are performed iteratively on a same set of signal samples.

17. The wireless device of claim 15, wherein the wireless device is further configured to:
perform a frequency offset estimation consistency check on the candidate discovery signal; and
determine whether the candidate discovery signal is a false positive based at least in part on the frequency offset estimation consistency check.

18. The wireless device of claim 15, wherein the wireless device is further configured to:
perform a peak to sidelobe ratio check for the candidate discovery signal; and
determine whether the candidate discovery signal is a false positive based at least in part on the peak to sidelobe ratio check.

19. The wireless device of claim 15, wherein the wireless device is further configured to:
determine that multiple candidate discovery signals are detected; and
perform coarse timing acquisition, coarse frequency offset estimation, fine timing acquisition, and fine frequency offset estimation iteratively on a same set of signal samples for each of the multiple candidate discovery signals.

20. The wireless device of claim 15, wherein the wireless device is further configured to:
determine that multiple candidate discovery signals are detected;
perform one or more of a frequency offset estimation consistency check or a peak to sidelobe ratio check on each of the multiple candidate discovery signals; and
determine whether each of the candidate discovery signal is a false positive based at least in part on one or more of the frequency offset estimation consistency check or the peak to sidelobe ratio check.

* * * * *